US012687387B2

(12) United States Patent
Wang et al.

(10) Patent No.: US 12,687,387 B2
(45) Date of Patent: Jul. 21, 2026

(54) DEPTH DATA MEASURING HEAD, COMPUTING DEVICE AND MEASUREMENT METHOD

(71) Applicant: SHANGHAI PERCIPIO TECHNOLOGY LIMITED, Shanghai (CN)

(72) Inventors: Minjie Wang, Shanghai (CN); Yushi Liang, Shanghai (CN)

(73) Assignee: Nanjing Percipio Technology Limited, Nanjing (CN)

( * ) Notice: Subject to any disclaimer, the term of this patent is extended or adjusted under 35 U.S.C. 154(b) by 118 days.

(21) Appl. No.: 18/284,690

(22) PCT Filed: Dec. 14, 2021

(86) PCT No.: PCT/CN2021/137790
§ 371 (c)(1),
(2) Date: Sep. 28, 2023

(87) PCT Pub. No.: WO2022/222496
PCT Pub. Date: Oct. 27, 2022

(65) Prior Publication Data
US 2024/0167811 A1      May 23, 2024

(30) Foreign Application Priority Data
Apr. 20, 2021    (CN) .......................... 202110423509.7

(51) Int. Cl.
*G01B 11/22*          (2006.01)
*G06T 7/521*          (2017.01)
(Continued)

(52) U.S. Cl.
CPC .............. *G01B 11/22* (2013.01); *G06T 7/521* (2017.01); *G06T 7/529* (2017.01); *G06T 7/55* (2017.01);
(Continued)

(58) Field of Classification Search
CPC . G01B 11/22; G01B 11/2527; G01B 11/2513; G01B 11/2545; G01B 11/254;
(Continued)

(56) References Cited

U.S. PATENT DOCUMENTS

| | | |
|---|---|---|
| 3,682,553 A | 8/1972 | Kapany |
| 6,542,249 B1 * | 4/2003 | Kofman .............. G01B 11/2513 356/601 |

(Continued)

FOREIGN PATENT DOCUMENTS

| | | |
|---|---|---|
| CN | 102621546 A | 8/2012 |
| CN | 103581625 A | 2/2014 |

(Continued)

*Primary Examiner* — Isiaka O Akanbi
(74) *Attorney, Agent, or Firm* — IPro, PLLC

(57) ABSTRACT

A depth data measuring head (600, 700) comprising: a structured light projection apparatus (110, 610, 710) used for projecting, under the drive of a driving apparatus (114, 314) and at different projection angles, a beam having a texture to a measured space so as to form different textures on an object to be measured; and first and second image sensors (620, 630; 720, 730) that are respectively arranged on both sides of the structured light projection apparatus (110, 610, 710), the first and second image sensors having a predetermined relative spatial position relationship and imaging the measured space at least twice so as to obtain at least two sets of images having different texture distributions, wherein the at least two sets of images are used for obtaining single-measurement depth data of the object to be measured. The structured light projection apparatus (110, 610, 710) that reflects, at different angles, structured light generated by a light source module (I) is used, so that rapid, economical and low-failure-rate multi-pattern projection is implemented. Furthermore, the structured light projection apparatus (110, 610, 710) matches multiple pairs of binocular sensors (723, 724; 733, 734) sharing a light path, thereby further short-
(Continued)

ening the frame interval and improving the quality of depth fusion data. Also disclosed is a depth data computing device and measurement method.

15 Claims, 5 Drawing Sheets

(51) Int. Cl.
 *G06T 7/529* (2017.01)
 *G06T 7/55* (2017.01)

(52) U.S. Cl.
 CPC ............... *G06T 2207/10028* (2013.01); *G06T 2207/20221* (2013.01)

(58) Field of Classification Search
 CPC ........... G06T 7/521; G06T 7/529; G06T 7/55; G06T 2207/10028; G06T 2207/20221
 USPC .................................................. 356/601–625
 See application file for complete search history.

(56) References Cited

U.S. PATENT DOCUMENTS

| | | | | |
|---|---|---|---|---|
| 6,549,288 | B1 * | 4/2003 | Migdal | G06T 7/521 |
| | | | | 356/601 |
| 8,320,047 | B2 * | 11/2012 | Tocci | G02B 27/106 |
| | | | | 359/636 |
| 9,204,041 | B1 | 12/2015 | Campbell | |
| 10,902,623 | B1 | 1/2021 | Li et al. | |
| 11,989,896 | B2 | 5/2024 | Schindler et al. | |
| 2004/0125205 | A1 | 7/2004 | Geng | |
| 2004/0246473 | A1 | 12/2004 | Hermary et al. | |
| 2005/0219552 | A1 | 10/2005 | Ackerman et al. | |
| 2007/0211258 | A1 * | 9/2007 | Lee | G01B 11/25 |
| | | | | 356/605 |
| 2009/0195790 | A1 * | 8/2009 | Zhu | G01B 11/24 |
| | | | | 356/612 |
| 2009/0322859 | A1 | 12/2009 | Shelton et al. | |
| 2010/0008588 | A1 * | 1/2010 | Feldkhun | G01B 11/005 |
| | | | | 382/206 |
| 2010/0079581 | A1 | 4/2010 | Russell et al. | |
| 2011/0037953 | A1 | 2/2011 | Nizani et al. | |
| 2012/0025112 | A1 | 2/2012 | Li et al. | |
| 2012/0314039 | A1 * | 12/2012 | You | H04N 13/271 |
| | | | | 348/46 |
| 2013/0127854 | A1 | 5/2013 | Shpunt et al. | |
| 2013/0155418 | A1 | 6/2013 | Shaw et al. | |
| 2014/0225992 | A1 * | 8/2014 | McDowall | A61B 1/00193 |
| | | | | 348/47 |
| 2015/0070472 | A1 | 3/2015 | Chen et al. | |
| 2015/0198800 | A1 | 7/2015 | Freedman et al. | |
| 2016/0341399 | A1 * | 11/2016 | Raz | G06F 3/017 |
| 2016/0344951 | A1 * | 11/2016 | Ko | H04N 13/254 |
| 2017/0245744 | A1 * | 8/2017 | McDowall | H04N 13/254 |
| 2018/0176544 | A1 | 6/2018 | Wang et al. | |
| 2018/0348368 | A1 * | 12/2018 | Bronstein | G01S 17/10 |
| 2019/0068951 | A1 * | 2/2019 | Mor | G02B 19/0057 |
| 2020/0284883 | A1 | 9/2020 | Ferreira et al. | |
| 2022/0155059 | A1 * | 5/2022 | Wang | G01B 11/2545 |
| 2023/0078604 | A1 | 3/2023 | Rein et al. | |

FOREIGN PATENT DOCUMENTS

| | | | | |
|---|---|---|---|---|
| CN | 103780844 | A | 5/2014 | |
| CN | 103868472 | A | 6/2014 | |
| CN | 104197861 | A | 12/2014 | |
| CN | 204902786 | U | 12/2015 | |
| CN | 107369156 | A | 11/2017 | |
| CN | 108650447 | A | 10/2018 | |
| CN | 109889690 | A | 6/2019 | |
| CN | 110501836 | A | 11/2019 | |
| CN | 209927097 | U | 1/2020 | |
| CN | 110926369 | A | 3/2020 | |
| CN | 111239729 | A | 6/2020 | |
| CN | 111692987 | A | 9/2020 | |
| CN | 111721238 | A | 9/2020 | |
| CN | 111721239 | A | 9/2020 | |
| CN | 111829449 | A | 10/2020 | |
| CN | 212747701 | U * | 3/2021 | G01B 11/25 |
| CN | 212779131 | U | 3/2021 | |
| CN | 212779132 | U | 3/2021 | |
| JP | H0791927 | A | 4/1995 | |
| JP | H10170239 | A | 6/1998 | |
| JP | H10213423 | A | 8/1998 | |
| JP | 2001108417 | A | 4/2001 | |
| JP | 2003166813 | A | 6/2003 | |
| JP | 2003228125 | A | 8/2003 | |
| JP | 2008224629 | A | 9/2008 | |
| JP | 2015501938 | A | 1/2015 | |
| JP | 2015102485 | A | 6/2015 | |
| JP | 2020053034 | A | 4/2020 | |
| NL | 2015160 | A | 7/2016 | |
| WO | 2018225517 | A1 | 12/2018 | |
| WO | 2019113445 | A2 | 6/2019 | |
| WO | 2019209064 | A1 | 10/2019 | |
| WO | 2020235348 | A1 | 11/2020 | |

* cited by examiner

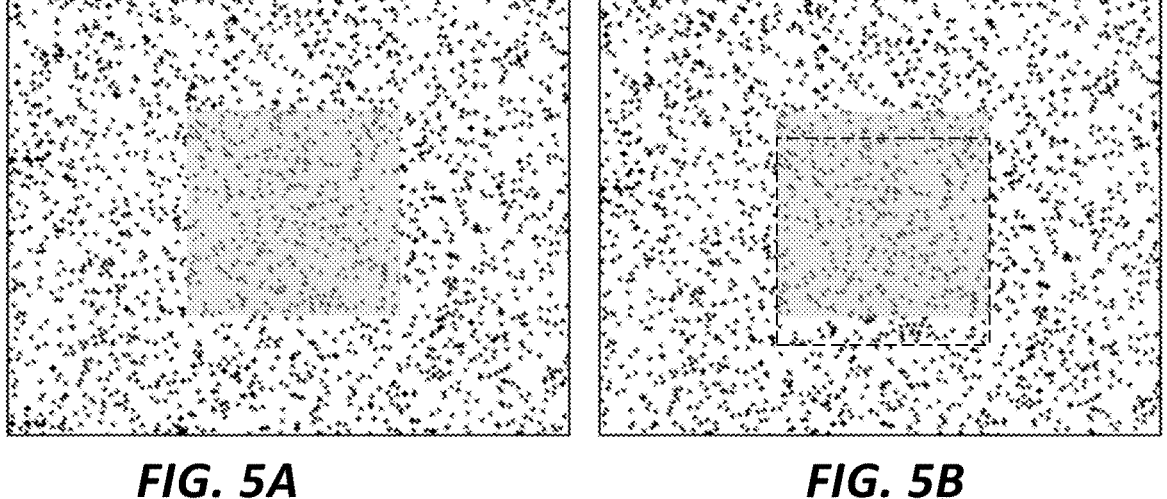
*FIG. 5A*                 *FIG. 5B*
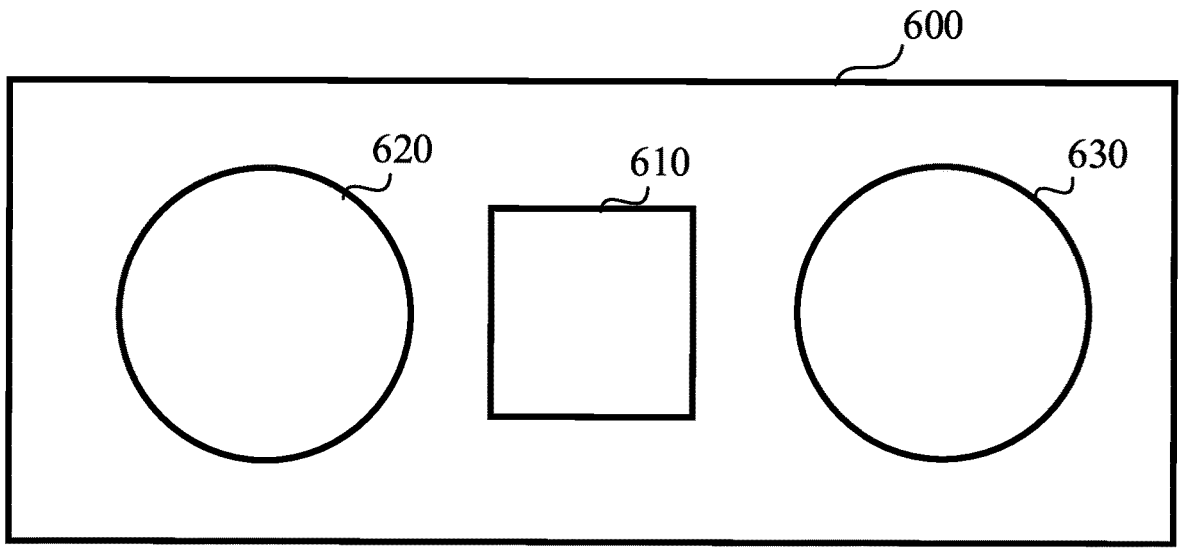
*FIG. 6*

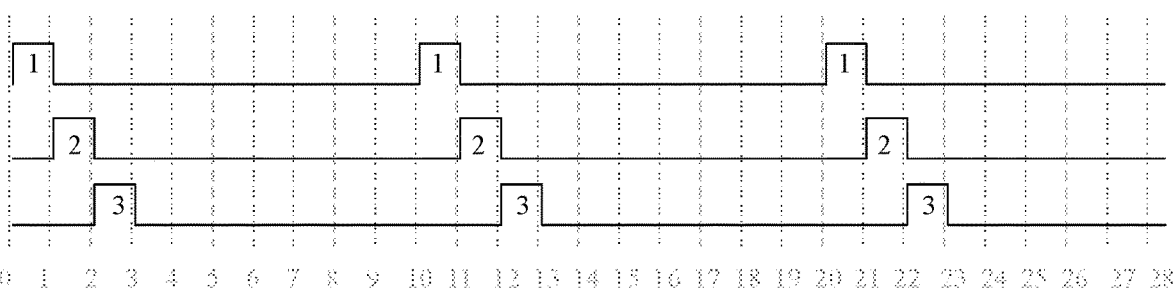

FIG. 9

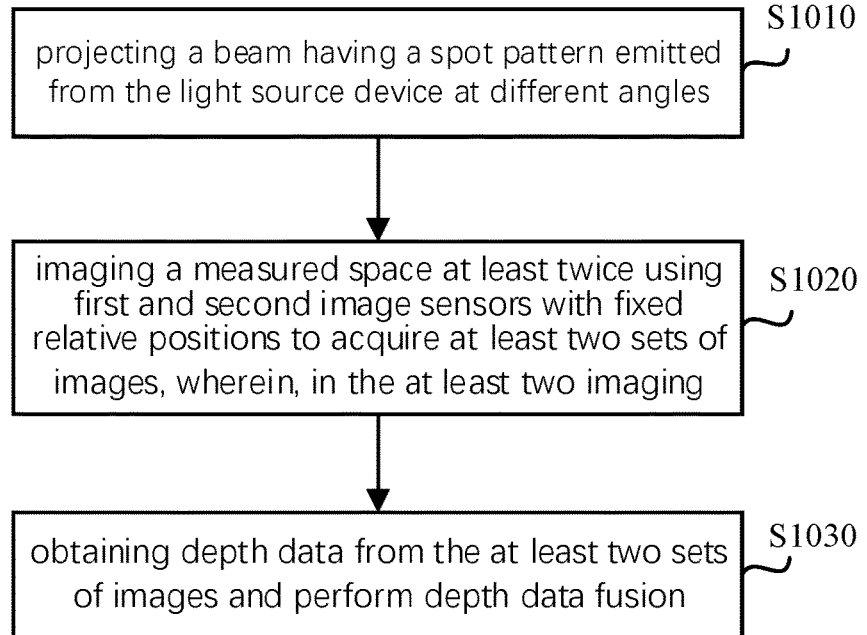

projecting a beam having a spot pattern emitted from the light source device at different angles    S1010 imaging a measured space at least twice using first and second image sensors with fixed relative positions to acquire at least two sets of images, wherein, in the at least two imaging    S1020 obtaining depth data from the at least two sets of images and perform depth data fusion    S1030

FIG. 10

DEPTH DATA MEASURING HEAD, COMPUTING DEVICE AND MEASUREMENT METHOD

TECHNICAL FIELD

The present disclosure relates to the technical field of three-dimensional measurement, in particular to a depth data measuring head, a computing device and a measuring method.

BACKGROUND

In recent years, 3D imaging technology has developed vigorously. At present, a binocular detection scheme based on structured light can perform three-dimensional measurement of the object surface in real time. Briefly, the scheme first projects a two-dimensional laser texture pattern with coded information on the surface of a target object, such as a speckle pattern, and the laser texture is continuously collected by two image acquisition devices with relatively fixed positions. A processor uses sampling window to sample the two images simultaneously collected by the two image acquisition devices, determines the matching laser texture pattern in the sampling window, and according to the difference between the matched texture patterns, calculating the depth distance of each laser texture sequence segment projected on the surface of the natural body, and obtaining the three-dimensional data of the surface of the object to be measured.

In the matching process, the larger the sampling window, the greater the amount of pattern information contained in a single sampling, so it is easier to match, but it will result in greater granularity of the obtained depth image. Correspondingly, the smaller the sampling window, the finer the granularity of the image, but the greater the false matching rate. Although it is possible to reduce the sampling window by successively capturing multiple sets of different images, this introduces additional system complexity and reduces the frame rate.

For this reason, an improved depth data measurement solution is needed.

SUMMARY

A technical problem to be solved by the present disclosure is to provide a depth data measurement solution, which can project patterns from multiple angles, especially using an improved structured light projection apparatus that can reflect the structured light generated by the light source device at different angles, so as to enable faster, less expensive projection with less failure rate. Furthermore, the structured light projection apparatus can cooperate with multiple pairs of binocular sensors sharing an optical path, thereby further shortening the frame interval, and improving the quality of depth data fusion.

According to a first aspect of the present disclosure, a depth data measuring head is provided, comprising: a structured light projection apparatus, for projecting, under the drive of a driving device and at different projection angles, a beam having a texture to a measured space so as to form different textures on an object to be measured in the measured space; and first and second image sensors respectively arranged on both sides of the structured light projection, the first and second image sensors having a predetermined relative spatial position relationship and imaging the measured space at least twice so as to obtain at least two sets of images having different texture distributions, wherein the at least two sets of images are used for obtaining single-measurement depth data of the object to be measured.

According to a second aspect of the present disclosure, a depth data computing device is provided, including: the depth data measuring head according to the first aspect of the present disclosure, and a processor, configured to acquire the at least two sets of images, determine the depth data of the texture in each set of images according to the predetermined relative spatial position relationship between the first and second image sensors, and fuse the depth data determined based on the at least two sets of images to obtain new depth data as single-measurement depth data of the object to be measured.

According to a third aspect of the present disclosure, a method for measuring depth data is provided, comprising: projecting a beam having a spot pattern emitted from the light source device at different angles; imaging a measured space at least twice using first and second image sensors with fixed relative positions to acquire at least two sets of images, wherein, in the at least two imaging, the measured space is projected with different spot patterns due to the different projection angles; and obtaining depth data from the at least two sets of images and perform depth data fusion.

Thus, the projection flexibility of the structured light projection apparatus is improved by rotating and reflecting the structured light. The device can be further combined with the mask light source and the coaxial binocular solution to further improve the accuracy and imaging speed of the multi-frame fusion solution.

BRIEF DESCRIPTION OF FIGURES

The above and other objects, features and advantages of the present disclosure will become more apparent by describing the exemplary embodiments of the present disclosure in more detail with reference to the accompanying drawings, wherein, in the exemplary embodiments of the present disclosure, the same reference numerals generally represent same parts.

FIGS. 5A-B show examples of speckle projection using the apparatus shown in FIG. 3 or FIG. 4.

FIG. 6 shows a block diagram of a depth data measuring head according to an embodiment of the present disclosure.

FIG. 9 shows a timing diagram of coaxial three-set binocular imaging.

FIG. 10 shows a schematic flowchart of a method for measuring depth data according to an embodiment of the present disclosure.

DETAILED DESCRIPTION

Figure 1:
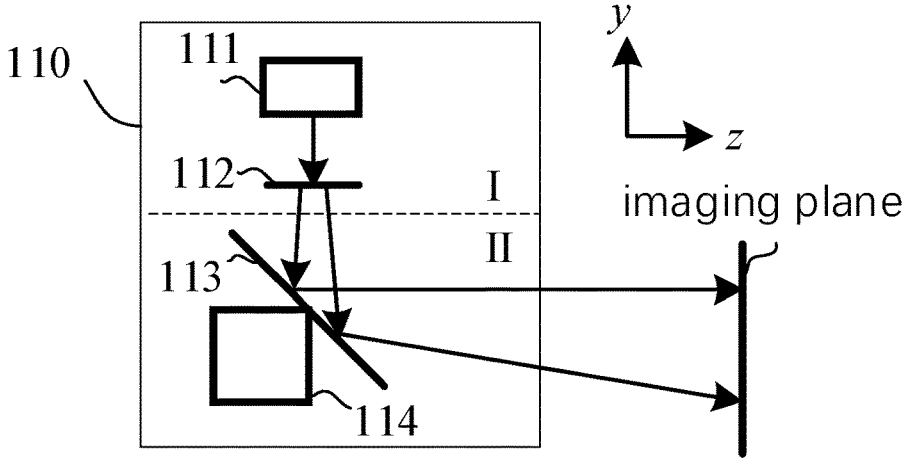
FIG. 1 shows a schematic composition diagram of a structured light projection apparatus according to an embodiment of the present disclosure.

Preferred embodiments of the present disclosure will be described in more detail below with reference to the accompanying drawings. Although preferred embodiments of the present disclosure are shown in the drawings, it should be understood that the present disclosure may be embodied in various forms and should not be limited to the embodiments set forth herein. Rather, these embodiments are provided so that this disclosure will be thorough and complete, and will fully convey the scope of the disclosure to those skilled in the art.

As mentioned above, in the matching process of binocular imaging, the larger the sampling window, the greater the amount of pattern information contained in a single sampling, so it is easier to match, but the greater the granularity of the resulting depth image. Correspondingly, the smaller the sampling window, the finer the granularity of the image, but the greater the false matching rate. Therefore, the sampling window can be reduced by successively capturing multiple sets of images.

For example, one light source device can be projected from different angles by using a driving device to drive the light source device to rotate. In this situation, even though the patterns projected by the light source devices are the same, they still appear as different patterns in the field of view of an imaging device (image sensor) due to different projection angles. However, due to the weight of the light source device itself and the need for wiring for power supply, the driving function of the driving device is limited. In addition, multi-frame-based depth data fusion will reduce the frame rate and reduce performance for capturing dynamic subjects.

To this end, the present disclosure provides a depth data measurement solution, which preferably uses an improved structured light projection apparatus that can reflect the structured light generated by the light source device at different angles, so as to achieve a faster, more economical multi-pattern projection with lower failure rate. Furthermore, a structured light projection apparatus can cooperate with multiple pairs of binocular sensors to share an optical path, thereby further shortening the frame interval and improving the quality of depth data fusion.

FIG. 1 shows a schematic composition diagram of a structured light projection apparatus according to an embodiment of the present disclosure. The structured light projection apparatus can be used for structured light projection in data measuring head of the present disclosure.

As shown, the structured light projection apparatus 110 includes a light source device I located above the dotted line and a steering projector II located below the dotted line. The light source device is used for generating the beam to be projected, while the steering projector is used for making the beam turn and exit.

Specifically, the light source device is used for generating and emit a beam having a texture. Usually, the light source device does not directly project the beam emitted by a light emitting device, but performs certain optical processing on the beam projected by the light emitting device to make it present desired distribution, brightness or pattern. For this reason, in different implementations, different speckle generation schemes can be used to achieve different projection effects.

As shown in FIG. 1, the light source device 1 includes a laser generator 111 and a diffractive optical element (DOE) 112. Wherein, the laser generator 111 is used for emitting a laser beam (shown by a single arrow leaving 111). The DOE 112 arranged on the outgoing optical path of the laser beam can modulate the incident laser light, such as diffracting the incident laser light and modulating it into discrete speckles with specific projection rules (as indicated by the double arrows leaving 112, the beam diffracted by the surface has a certain width, that is, occupies a certain area on the plane where the DOE 112 is located).

In one embodiment, the laser generator 111 is a laser diode (LD), such as an edge-mode laser diode. The laser light generated by the LD can be collimated by a collimating lens (not shown in FIG. 1), and then diffracted by the DOE 112. In the case that the laser generator 111 is a single-beam laser generator such as an LD, the DOE 112 can have a relatively complicated structure to diffract one incident laser spot into a pattern with multiple spots (for example, with two thousand, or even two 10,000 spots) to form a projected complex speckle. Due to collimation, fixed-point projection can be performed through diffraction, which has the advantages of long working distance and low power consumption.

In another embodiment, the laser generator 111 can be implemented as a VCSEL (Vertical Cavity Surface Emitting Laser). Since the VCSEL itself can include multiple luminescent particles, a VCSEL chip itself can emit a certain pattern, for example, a pattern formed by 100 luminescent particles. In this situation, the DOE 112 only needs simple replication, such as direct replication, interleaved replication, or rotational replication, to realize the speckle pattern of 2,000 or even 20,000 spots mentioned above. Although collimation is usually not possible, VCSEL solutions can be more energy efficient and require less DOE complexity.

In other embodiments, the light source device 1 can also be realized by using other solutions than lasers and diffraction elements. For example, the light source device can include a floodlight source for generating flood light; and a mask arranged on the flood light source for converting the flood light into speckles with a specific projection code.

In the embodiments of using a flood light source and a mask, since the mask can be designed with higher precision than DOE, a higher-precision speckle pattern can be obtained, and its information ratio (the proportion of the area occupied by speckle in the projection area) can be higher compared to previous DOE schemes, for example up to 50%. For the calculation of spatially decoded depth data of projected speckle, a higher information ratio means that more surface depth information can be obtained in a single projection, which means that more information is obtained. However, since the light energy in the masked area cannot actually be utilized, the energy conversion efficiency of the masking scheme is not high. In other words, the structured light generation scheme using a flood light source and a mask is more suitable for close-range high-precision imaging scenarios.

Further, the steering projector is used for reflecting the beam (e.g., the speckle pattern) generated by the light source device so as to emit. However, unlike the conventional reflection part, the steering projector of the present disclosure can drive the movement of the reflection part, so that the beam reflected by the reflection module can change.

Specifically, as shown in FIG. 1, the steering projector II can include a reflecting device 113 and a driving device 114. The reflecting device 113 arranged on the outgoing path of the beam can be used to reflect the incident beam so that the beam is emitted, and the driving device 114 connected to the reflecting device can be used to change the relative position of the reflecting device. The angle of the incident beam changes, thereby changing the outgoing direction of the beam.

In the embodiment of the present disclosure, for the convenience of description, the direction in which the light emits (that is, the direction in which the light leaves the measuring head) can be agreed to be the z direction, the horizontal direction of the shooting plane is the x direction, and the vertical direction is the y direction. Thus, in FIG. 1 and FIG. 2, FIG. 3 and FIGS. 4A-B which will be described below, examples in which the light source module projects the structured light downward (y direction) and changes the emission direction to the z direction (in fact, it is a direction with a slight angle deviation along the z direction) by the steering projection module will be described in detail. It should be understood that, in other embodiments, the structured light projection apparatus of the present disclosure can also be arranged or placed in other directions according to the needs of the actual imaging scene.

Figure 2:
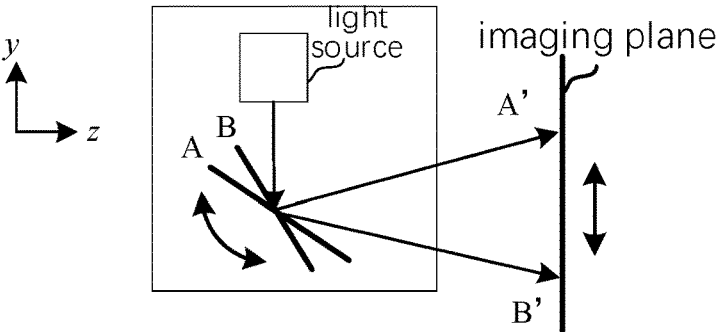
FIG. 2 shows a schematic diagram of changing the projection direction of the present disclosure.

For easy understanding, FIG. 2 shows a schematic diagram of changing the projection direction in the present disclosure. The light emitted by the light source projects downward along the y-axis to a reflecting device, such as a mirror, and is reflected by the reflecting device to a measured space, and can form speckles on an imaging plane perpendicular to the z-axis. The reflecting device can be rotated axially along the x-axis, for example, in the angle range of A-B as shown, so that speckles moving in the range of A'-B' on the imaging plane can be correspondingly obtained. When the light source device I shown in FIG. 1 projects discrete spots with a two-dimensional distribution pattern, although the patterns projected by the light source device 1 onto the reflector are the same (because the relative positions of the laser emitter 111 and the DOE 112 are fixed, and they are not driven), but due to the rotation of the mirror, the projected pattern will have an angular offset. Therefore, when used in combination with binocular imaging as described below, the pattern captured by the image sensor at different projection angles can be regarded as different patterns.

Although FIG. 2 shows a reflector capable of rotating within a larger A-B angle range in order to clarify the principle of the present disclosure, it should be understood that in actual application scenarios, projection angle difference with one pattern can be very small, for example, 1°, so that while ensuring that the imaging patterns are not the same, roughly coincident imaging ranges can be ensured.

Figure 3:
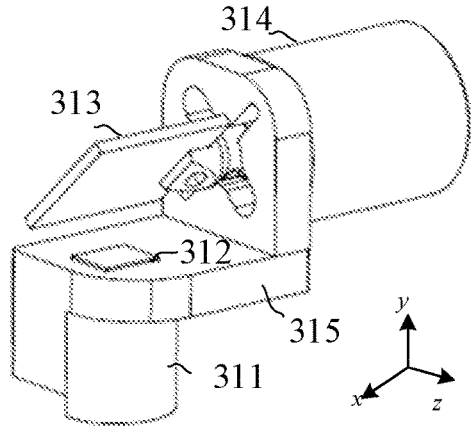
FIG. 3 shows a perspective view of a structured light projection apparatus according to an embodiment of the present disclosure.
Figure 4A:
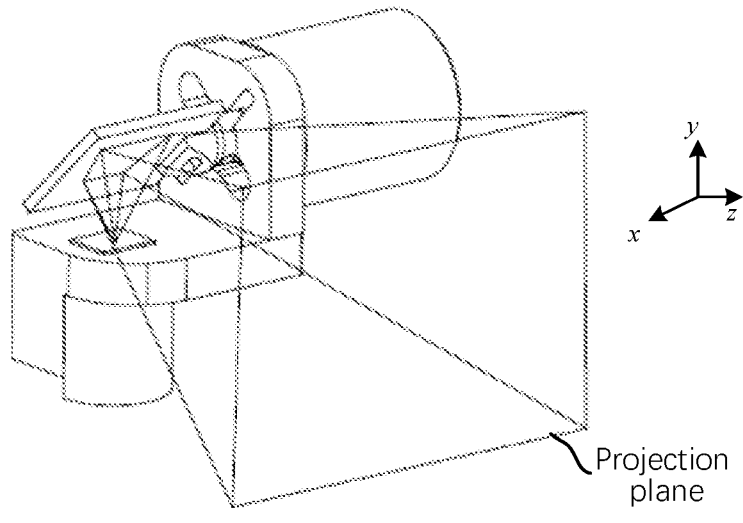
FIGS. 4A-B show examples of structured light projected by the structured light projection apparatus shown in FIG. 3 under different perspective angles.
Figure 4B:
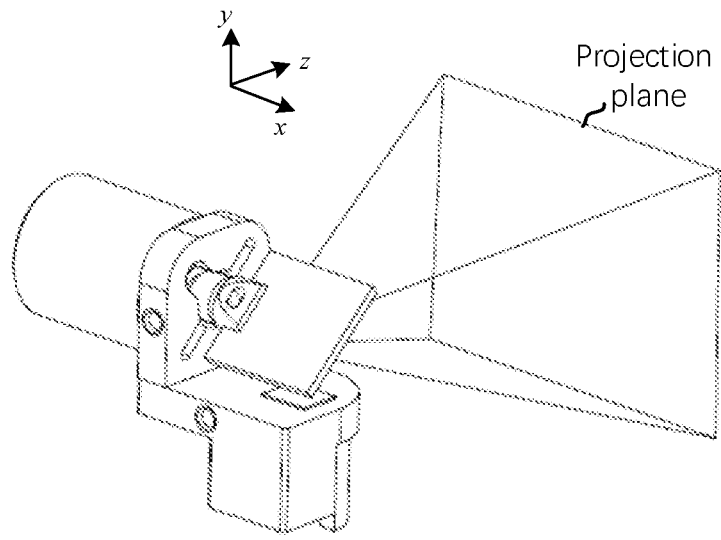

Further, FIG. 3 shows a perspective view of a structured light projection apparatus according to an embodiment of the present disclosure. FIGS. 4A-B show examples of structured light projected by the structured light projection apparatus shown in FIG. 3 under different perspective angles.

As shown, the laser generator 311 can be set inside the casing (or a fixed structure) 315, and the light source generated by it can be diffracted by the DOE 312 arranged on the outgoing light path to obtain a diffraction pattern with a certain two-dimensional distribution, the diffraction pattern propagates upwards to the mirror 313, and the mirror 313 reflects the diffraction pattern so that it (approximately) emits along the z direction, and formed on a speckle pattern in the projection plane perpendicular to the z direction (as shown in FIG. 4A and FIG. 4B, where FIG. 4B can be seen as a view of the device shown in FIG. 3 and FIG. 4A rotated 90° counterclockwise along the y-axis). The projection planes of FIGS. 4A and 4B can be viewed as a three-dimensional illustration of the imaging plane shown in FIG. 1.

Further, the driving device can control the reflecting device to move along the axial direction, wherein the beam emitted from the light source device is incident on the reflecting device in a direction perpendicular to the axial direction (x direction), and based on the axial movement of the reflecting device, changes Outgoing direction.

Specifically, as shown, the rotating shaft protruding from the driving device (for example, a motor) 314 is fixedly connected with the reflector 313, so when the motor is working, the rotating shaft drives the reflector 313 to move axially. Thus, a projection pattern with a certain angular offset is formed on the projection plane. These projection patterns are different patterns for the image sensor that captures the projection. Therefore, the projection device of the present disclosure can conveniently achieve "different" patterns projection by rotating and reflecting structured light (for example, a diffraction pattern with a two-dimensional distribution.

In some embodiments, the steering projector can be a vibration mirror, and the motor can drive the mirror to reciprocate within a certain range. In some other embodiments, the steering projector can be a rotating mirror, and the motor can only move in one direction along the axial direction.

Specifically, the steering projector can be a mechanical vibrating mirror reciprocating at a predetermined frequency, so that the structured light can be projected to the measured area at a predetermined frequency, thereby presenting a two-dimensional diffraction pattern (speckles) moving up and down along the y direction on the projection plane. Due to the controllability of the mechanical vibrating mirror, it is also possible to keep the steering projector still during a predetermined window period during continuous motion.

For example, a mechanical vibrating mirror can have a range of motion of ±1° along the z direction and can have a vibration frequency of up to 2 k per second. When used in conjunction with an image sensor, for example, in the application scenario where three frames of images are combined into one frame of image, the mechanical vibrating mirror can be paused for a period of time when it moves to −1°, 0° and 1°, for example, remain stationary for the exposure time (for example, 1 ms) required by the photosensitive unit, so that during the exposure of the image sensor, the projected pattern remains unchanged, thereby improving imaging accuracy.

In the embodiment using the rotating mirror, although the rotating mirror can only rotate in one direction, and it is difficult to control the variable speed, the movement angle of the rotating mirror can be sensed by a device such as a photodiode, and perform structured light projection and dynamic imaging in a suitable angle range, such as projecting and imaging in the interval of ±1° along the z direction in 360°.

FIGS. 5A-B show examples of speckle projection using the apparatus shown in FIG. 3 or FIG. 4. Those shown in FIG. 5A and FIG. 5B can be regarded as the patterns projected by the mechanical vibrating mirror when it moves to 1° and −1°, respectively, and can also be regarded as the imaging of the image sensor when the structured light projection apparatus cooperates with the image sensor to form a measuring head. For the convenience of understanding, the black frame shows the projection range of the speckle. It should be understood that in actual use, the black frame itself will not be projected. In addition, since within the speckle projection range, the speckle occupies less than 30% of the area, so it can be considered that the projection scheme of the laser generator and DOE is adopted.

Since the same DOE (more specifically, the same pattern on the same DOE) was used, as shown in FIG. 5A and FIG. 5B, the projected two patterns are actually "identical", but due to the different projection angles, so the pattern in FIG. 5B is shifted down a certain distance along the y direction. When measuring an object at the same position, such as the gray square in the figure, the speckle projected on the object is actually different (the projected pattern in the range indicated by the dotted box in FIG. 5B is the same as the projected pattern in FIG. 5A), so it can be considered that different patterns are projected on one object to be measured. And due to the irregularity (or randomness) of the speckle pattern, in different angles of projection, different positions on the surface of the square object are projected to the speckle, so more surface depth information can be obtained in the subsequent depth data fusion.

In addition, it should be understood that although in the examples given in FIGS. 1-5B, the projected structured light is projected along the z direction and fluctuates in the vertical direction (y direction), but in other implementations, the projected structured light can also be projected along the z direction and change in the horizontal direction (x direction), or projected with angle changes in both the x and y directions. In other words, by changing the projection angle in different directions, the dotted box shown in FIG. 5B can be moved up and down, left, and right or even along a diagonal line.

In addition, the number of image sets required for obtaining single-measurement depth data of the object to be measured can be determined according to a specific application scenario. For example, when the number of image sets that can be processed per second is determined, the imaging frame rate can be increased by reducing the number of image sets required for a single measurement of depth data; or the imaging accuracy can be improved by increasing the number of image sets required for a single measurement of depth data.

When using the projection structure shown in FIGS. 4A-B, if the number of image sets required for a single measurement of depth data need to be reduced, the angle of motor change can be reduced; if the number of image sets required for a single measurement of depth data need to be increased, then the angle of motor change can be increased accordingly.

In one embodiment, the structured light projection apparatus of the present disclosure can have five adjustable imaging rates, for example. At the highest frame rate (i.e., the highest gear), a frame rate of, for example, 100 frames/second can be achieved. In this situation, each calculation of the measured depth data only uses one set of image frames captured at the same time, and the projection angle of the motor always remains unchanged. At the second highest frame rate (i.e., the second highest gear), a frame rate of, for example, 50 frames/second can be achieved. In this situation, the calculation of each measurement depth data uses two sets of image frames taken at different times, and the motor projection angle need to be changed accordingly, for example, transforming back and forth between 0.5° and 0°, and Shooting is performed separately at 0.5° and 0° to obtain two sets of image frames for fusion. Similarly, when the frame rate is in the middle (that is, mid-range), Shooting is performed at 0.5°, 0°, and −0.5° respectively to obtain three sets of image frames for fusion to achieve a frame rate of 33 frames/s. At the second lowest frame rate (i.e., the second lowest gear), a frame rate of, for example, 25 frames/second can be achieved. While at the lowest frame rate (i.e., the lowest gear), a frame rate of, for example, 20 frames/s can be achieved.

The higher the frame rate, the fewer pixels each frame contains, but it is suitable for occasions that require high-speed imaging; the lower the frame rate, the more pixels each frame contains, and due to the increase in the number of images used for measurement, the size of the matching window can be reduced at the same time, so as to obtain higher precision, which is suitable for occasions where high-precision imaging is required but the imaging frame rate need not too high. In actual use, users can select the corresponding gear according to their needs, and make the driving mechanism, light source, image sensor and processor cooperate with each other to achieve the required image capture and fusion calculation.

The structured light projection apparatus of the present disclosure can be used for the measurement of depth data. FIG. 6 shows a block diagram of a depth data measuring head according to an embodiment of the present disclosure.

As shown, a depth data measuring head 600 includes a structured light projection apparatus 610 and a first image sensor 620 and a second image sensor 630 having a predetermined relative positional relationship.

The structured light projection apparatus 610 can project beam having a texture to a measured space through different projection angles under the drive of a driving device it contains, so as to form different textures on an object to be measured in the measured space (such as different textures shown in FIGS. 5A and 5B).

The first and second image sensors 620 and 630 respectively arranged on both sides of the structured light projection apparatus image the measured space at least twice during the movement of the reflecting device, so as to obtain at least two sets of images with different texture distributions. wherein the at least two sets of images are used to obtain single-measurement depth data of the object to be measured.

In one embodiment, the structured light projection apparatus 610 can include a light source device for generating and emitting a beam having a texture; and a driving device for driving the light source device to project the beam having a texture downward to the measured space with different projection angles. In other words, the driving device can directly drive the light source device to perform angle transformation. In this case, the driving device can be, for example, a voice coil motor on which the light source device is installed.

In a more preferred embodiment, the structured light projection apparatus 610 can be a structured light projection apparatus including a reflecting device as described above in conjunction with FIG. 1, FIG. 3 and FIG. 4. A measuring head based on this structured light projection apparatus will be described in detail with reference to FIG. 7. In addition, the example in FIG. 7 further includes a preferred imaging scheme of sharing an optical path.

Figure 7:
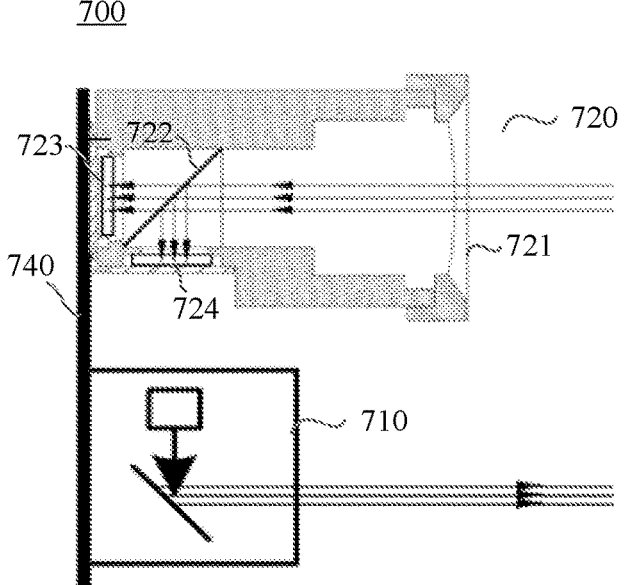
FIG. 7 shows a schematic composition diagram of a depth data measuring head according to an embodiment of the present disclosure.

FIG. 7 shows a schematic composition diagram of a depth data measuring head according to an embodiment of the present disclosure. For the sake of simplicity, a composition example of one of the image sensors 720 is given in more detail in the figure.

As shown, a depth data measuring head 700 based on the binocular principle includes a projection device 710, and a first image sensor 720 and a second image sensor 730 having a predetermined relative positional relationship. The projection device 710 can be the structured light projection apparatus described above with reference to FIG. 1 and FIGS. 3-4.

Although not shown for convenience of illustration, the measuring head 700 can also include a housing for surrounding the above-mentioned devices, and the connecting structure 740 shown in FIG. 7 can be regarded as a mechanism for fixing the above-mentioned devices and connecting to the housing. In some embodiments, connection structure 740 can be a circuit board including control circuitry thereon. It should be understood that, in other implementations, the above-mentioned devices 710-730 can be connected to the casing in other ways, and perform corresponding data transmission and command reception operations.

Here, the projection device 710 is used to project structured light to the shooting area, such as the same pattern diffracted by DOE, but due to the existence of the steering mechanism, the same pattern can be projected at different angles, so that the first image sensor 720 and the second image sensor 730 having a predetermined relative positional relationship can photograph the shooting area to obtain a set of image frame pairs with different patterns. This set of image frame pairs can be used for a single depth data calculation of the shooting area.

Specifically, the first image sensor 720 and the second image sensor 730 can be respectively arranged on both sides of the structured light projection apparatus 710. There is a predetermined relative spatial position relationship between the first and second two image sensors, and the measured space is imaged at least twice during the movement of the reflecting device, so as to obtain at least two images with different texture distributions. A set of images, wherein the at least two sets of images are used to obtain single-measurement depth data of the object to be measured.

For example, the projection device 710 can, driven by its driving device, project beam having a texture to the measured space at constantly changing projection angles, so as to form different textures on the objects to be measured in the measured space. The image sensor can perform multiple imaging during the rotating process, for example, imaging when moving to −1°, 0° and 1°, thereby obtaining a set of image frame pairs including three pairs (6 frames). These 6 frames of images are jointly used for one depth data calculation of the shooting area, that is, a depth image of one frame can be calculated.

In some embodiments, the light source device in the projection device 510 can be kept constantly on during operation, and the image sensor can image many times at a specific angle or any angle (or any angle within a predetermined range of movement) of the steering device.

For example, in a scenario where a controllable mechanical rotating mirror is used, corresponding imaging can be performed according to the rotation angle of the rotating mirror, for example, imaging is performed when moving to −1°, 0° and 1°. Corresponding exposure can also be performed according to the measured rotation angle.

In some embodiments, the rotation angle and the exposure of the image sensor can not be synchronized. For example, when the mechanical rotating mirror is set to rotate within ±1°, the image sensor can take a required set of images at any time and at any interval, as long as the shooting interval does not completely coincide with the rotating frequency of the rotating mirror, different images can be captured. In other words, since the difference between the same set of images is compared in the binocular scene, and there is no need to compare with the reference pattern, it is not necessary to specify what pattern is projected.

In other embodiments, the light source device in the projection device 710 can be synchronized with the exposure of the image sensor. In this situation, the measuring head 700 can also include a controller, which is configured to control the light source device to be turned on synchronously when the first and second image sensors are exposed.

In addition, the controller can also be configured to control the driving device to stay still during exposure of the first and second image sensors. Thereby, compared with imaging during the movement of the driving device, a clearer projection pattern, for example, discrete spots, can be obtained.

In some embodiments of the present disclosure, the first and second image sensors can be conventional image sensors. However, in other embodiments, each of the first and second image sensors includes at least two sub-image sensors that share at least part of an optical path, and each of the at least two sub-image sensors is used to perform one of the at least two imaging.

In the prior art, each of the first image sensor and the second image sensor includes only one photosensitive unit, and each photosensitive unit performs three imaging to obtain a set of three image frame pairs (6 frames). In the present disclosure, the first and second image sensors each include at least two sub-image sensors sharing at least part of the optical path, and the at least two sub-image sensors are respectively used for imaging different patterns of structured light successively projected by the projection device.

FIG. 7 shows an example in which the first and second image sensors each include two sub-image sensors (photosensitive units). As shown, the first image sensor 720 includes sub-image sensors 723 and 724, and the second image sensor 730 includes sub-image sensors 733 and 734. Among them, the sub-image sensors 723 and 724 share an optical path until a beam splitting surface of a beam splitting device 722, and are at the same distance from the aforementioned beam splitting area. Likewise, the sub-image sensors 733 and 734 share an optical path until a beam splitting surface of a beam splitting device 732, and are at the same distance from the aforementioned beam splitting area. In other words, the present disclosure introduces sets of binocular structures coaxial with each other. Here, the sub-image sensors 723 and 733 located in different image sensor housings can be regarded as a first set of image sensors (first set of binoculars), which are used to image structured light at one projection angle. Subsequently, the sub-image sensors 724 and 734, considered as a second set of image sensors (second set of binoculars), can be used to image the structured light at another projection angle. In other words, it can be regarded that the sub-image sensors 724 and 734 coaxial with 723 and 733 respective are in place (that is, have an equivalent optical path), replacing 723 and 733 to perform imaging of the latter pattern structured light. Thus, the imaging interval of two adjacent frames can be imaged at a smaller interval without depending on the frame interval of each image sensor.

Therefore, the measuring head 700 can further include: synchronization device for making the at least two sub-image sensors included in each of the first and the second image sensors 720 and 730 to sequentially image the structured light of at least two different patterns at a first interval which is smaller than the frame imaging interval of the sub-image sensor, while the projection device is projecting the at least two different patterns of structured light at the first interval. Correspondingly, each sub-image sensor still performs its next frame imaging at a second interval not smaller than the frame imaging interval of the sub-image sensor (for example, imaging at its own frame interval), and the above-mentioned imaging operations can be synchronized with the projection of the projection device by the synchronization device.

Figure 8:
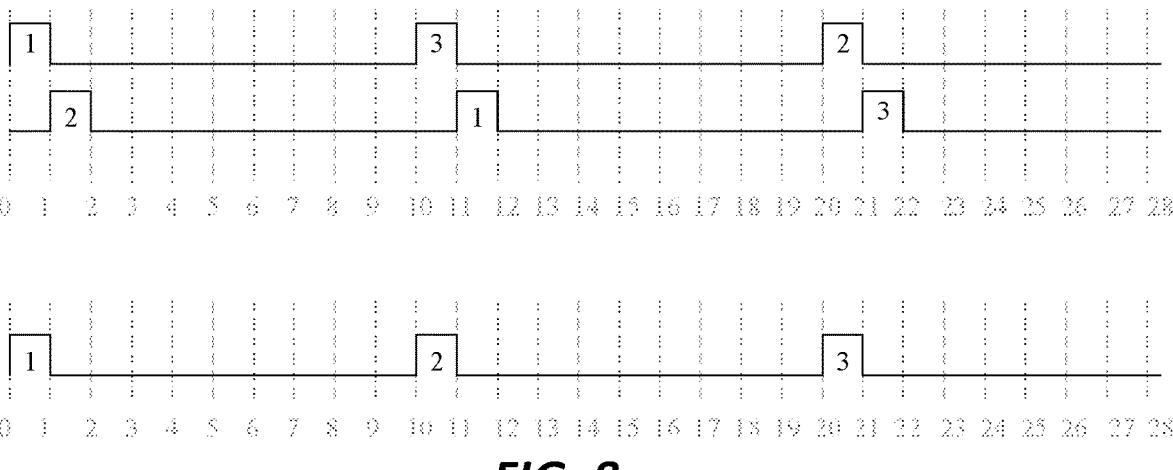
FIG. 8 shows a comparison timing diagram of coaxial two-set imaging and single-set imaging.

FIG. 8 shows a comparison timing diagram of coaxial two-set imaging and single-set imaging. For the convenience of explanation here, the frame rate of each photosensitive unit (sub-image sensor) can be set to 100 frames/s, then the frame interval is 10 ms (for example, the minimum frame interval is 10 ms), and the required exposure time of each photosensitive unit can be set to 1 ms.

If the first and second image sensors 720 and 730 are conventional image sensors including only a single photosensitive unit, when the three patterns shown in FIG. 1 (corresponding to the six acquired images) are used for depth data calculation, then as shown in the lower part of FIG. 8, three imaging is required at the 0th, 10th, and 20th ms. Then, compositing each depth data image requires the object to remain still for 21 ms (thus making it harder to capture moving objects), and the frame rate is also dropped from 100 frames/s to 33.3 frames/s.

In contrast, if the first and second image sensors 720 and 730 are composed of two photosensitive units (for example, the first and second image sensors 720 and 730 each include sub-image sensors 723 and 724, and the sub-image sensors 733 and 734) of the image sensor of the present disclosure, when three patterns are used for depth data calculation, as shown in the upper part of FIG. 8, the first set of photosensitive units performs imaging for pattern 1 (for example, the pattern under the first projection angle) at 0 ms, and then the second set of photosensitive units performs imaging for pattern 2 (for example, the pattern under the second projection angle) at 1 ms, and then after an interval of 10 ms, the first set of photosensitive units performs imaging for pattern 3 (for example, the pattern under the third projection angle) at 10 ms, so that three imaging required for one depth data image are completed. Subsequently, at 11 ms, the second set of photosensitive units can start the next round of imaging for pattern 1. At 20 ms, the first set of photosensitive units performs imaging for pattern 2. At 21 ms, the second set of photosensitive units performs imaging for the pattern 3 again. In this way, the imaging interval of different sets of photosensitive units only needs to be separated by the time required for imaging (for example, 1 ms), and the re-imaging interval of the same set of photosensitive units still follows the minimum frame interval time corresponding to the frame rate (for example, 10 ms). Thus, by introducing two sets of coaxial binoculars, it only needs to keep the object stay still for 11 ms to synthesize a depth data image (so it is easier to shoot moving objects), and the frame rate can be kept close to 66.6 frames/s.

Although an example with two sets of coaxial (the same optical axis) photosensitive units is described in conjunction with FIG. 7 and FIG. 8, in other embodiments, each of the first and second image sensors can further include more photosensitive units. FIG. 9 shows a timing diagram of coaxial three-set binocular imaging. In this situation, each of the first and second image sensors can include three coaxial photosensitive units (sub-image sensors). Thus, as shown in FIG. 9, the first set of photosensitive units performs imaging for pattern 1 at 0 ms, and then the second set of photosensitive units performs imaging for pattern 2 at 1 ms, and then the third set of photosensitive units performs imaging for pattern 2 at 1 ms. The photosensitive unit of the set performs imaging for the pattern 3 at 2 ms. Subsequently, the next round of three sets of imaging starts at 10 ms, the next round of three sets of imaging starts at 20 ms, and so on. Therefore, by introducing three sets of coaxial binoculars, it only takes 3 ms to obtain three sets (6 frames) of images required to synthesize a depth data image, that is, the object only needs to remain still for 3 ms, thus the shooting effect for moving objects is greatly improved. and the frame rate can be kept close to 100 frames/s (in this example, it takes 1003 ms to shoot 100 frames, which is 1.003 seconds).

It should be understood that simply by introducing an additional set of coaxial binocular structures (or monocular structures), the frame rate of depth data based on multi-frame synthesis can be doubled and the imaging time of each frame can be shortened. Theoretically, coaxial binocular structures with the same number of sets of images projected by the projection device can be arranged, so that the framing time of each depth frame and the frame interval of the sensor are only related to the multiple of the exposure time (if the frame interval is greater than exposure time×number of coaxial structure sets). For example, in the case of synthesizing depth frames based on four patterns, if two sets of coaxial binoculars are used as shown in FIG. 7, the imaging time for acquiring four frames increases slightly to 12 ms, but the frame rate drops to nearly 50 frames/s. But if four sets of coaxial binoculars are used, the imaging time for acquiring four frames is only 4 ms, and the frame rate remains close to 100 frames/s. However, introducing too many coaxial structures will increase the difficulty of constructing the image sensor, which requires a compromise between cost, feasibility, and imaging speed.

In addition, it should be understood that, in order to illustrate the performance of coaxial imaging, FIG. 8 and FIG. 9 give an example in which the second sub-image sensor 723 images for 1 ms immediately after the first sub-image sensor 722 performs imaging for 1 ms. However, in practical, the imaging interval between the first and second sub-image sensors also needs to consider the driving of the driving device. Specifically, if the imaging is performed directly during the driving process and there is no requirement for the exact angle of projection, the imaging of the second sub-image sensor as shown in FIG. 8 and FIG. 9 can be performed directly after the first sub-image sensor completes the imaging. But if there is a requirement for the exact angle of projection, or for the drive device to stay still during the exposure, after the first sub-image sensor has finished imaging, it is necessary to wait for the drive device to move into the proper position (and/or get into the right state, for example, completely still), and then perform the exposure of the second sub-image sensor. Because the moving speed of the rotating mirror and the vibrating mirror is extremely fast, the waiting time is relatively short, such as tens of μs.

In the case of combining multiple sets of coaxial binocular structures for imaging, the actual frame rate can also be set according to needs, for example, to provide users with high, medium, and low frame gears. In different gears, the number of image sets to be captured for each frame is different, for example, two sets for high-grade, four sets for mid-range, and six sets for low-grade. When the user selects the corresponding gear, the motor selection angle and frequency, structured light projection and imaging time are set accordingly to meet different imaging needs. In addition, when the processor performs calculations, different matching windows can also be set according to the number of image sets included in the generated single-time depth data. For example, the matching windows of the left and right images of the low gear six sets can be smaller than the matching windows of the two gear two sets. Thereby improving the imaging precision.

In order to realize the coaxial configuration of different photosensitive units in the same image sensor, it is necessary to design the optical path. In the example of FIG. 7, a coaxial arrangement based on beam splitting is shown. Thus, taking the first image sensor 720 as an example, it can include: lens assembly 721 for receiving the incident return structured light; a beam splitting device 722 for dividing the incident return structured light into at least a first beam and a second beam; the first sub-image sensor 723, for imaging the first beam; the second sub-image sensor 724, for imaging the second beam corresponding to the returned structured light of different patterns.

In one embodiment, the beam splitting device 722 is an optical prism, such as a square prism or a triangular prism. Thus, the reflected infrared light in the incident light reaches the second sub-image sensor 724, and the unreflect light in the incident light can travel straight to the first sub-image sensor 723.

As shown, the beam splitting device 722 in the form of a prism can split the incident light into two beams whose propagation directions are perpendicular to each other. Correspondingly, the first sub-image sensor 723 and the second sub-image sensor 724 can also be arranged vertically, so as to respectively receive the incident visible light and infrared beams at a vertical angle.

To eliminate parallax and achieve pixel-level alignment, components in the incident light need to have the same optical path length. Thus, in the case of using a quadrangular prism as the beam splitting device 722, the first sub-image sensor 723 and the second sub-image sensor 724 can be arranged at an equal distance from the beam splitting area of the beam splitting device 722. In the case of using a triangular prism as the beam splitting device 722, the distance between the two photosensitive units and the beam splitting device 722, especially the beam splitting area, can be flexibly adjusted according to the ratio of the refractive index of the air to the prism material.

Pixel-level alignment (or approximate alignment) between the first sub-image sensor 723 and the second sub-image sensor 724 can theoretically be achieved by making incident light share most of the optical path and have the same optical path length. However, in the actual manufacturing process of the image sensor because the actual arrangement of the first sub-image sensor 723 and the second sub-image sensor 724 cannot present ideal vertical and equidistant conditions, there will be a deviation between the imaging of the two. In this situation, forced software correction can be performed on the fabricated image sensor. For example, by introducing a calibration target and aligning the images of the first sub-image sensor 723 and the second sub-image sensor 724 with the calibration target, real pixel-level correction can be realized. In other words, the pixel-level alignment between the first sub-image sensor 723 and the second sub-image sensor 724 can be precise pixel-level alignment, or can have several pixel differences and achieve alignment through calibration.

As shown, the image sensor 720 of the present disclosure can be implemented as a separate module. Therefore, the image sensor 720 can also include a housing for fixing the relative positions of the lens assembly, the beam splitting device, and the two photosensitive units. Preferably, the casing can be combined with the lens assembly 721 to form a sealed body, so as to avoid contamination of the contained components by the external environment. In other embodiments, the image sensor 720 of the present disclosure can be a part of a larger module (e.g., a depth data measuring head), and the housing of the larger module realizes the fixing between the various components.

Preferably, the image sensor 720 can further include cables connected to the first sub-image sensor 723 and the second sub-image sensor 724, respectively. The housing then has openings for cable entry. In one embodiment, the cable can be a flexible cable, such as an FPC (flexible printed circuit) wire.

In one embodiment, before the beam enters the first sub-image sensor 723 and the second sub-image sensor 724, it can also pass through a filter to further filter out the influence of light of other wavelengths. In one embodiment, the projection device can project infrared laser light, so the optical filter arranged in the image sensor can be a corresponding infrared light transmission unit, and is used for transmitting infrared light in a specific frequency range, for example, the wavelength used in the present disclosure is 780-1100 nm infrared light. In other embodiments, the projection device can also project visible light, such as projecting red laser light or blue laser light, such as 635 nm red light or 450 nm blue light. Although the ambient light can also include red light or blue light, due to the short exposure time and the strong instantaneous laser light, it is also possible to perform imaging with a high signal-to-noise ratio with the help of the corresponding filter that transmits red light or blue light. In addition, since the sensor has a better photoelectric conversion efficiency for blue light than red light, and the shorter the wavelength band, the higher the accuracy, so it can be considered comprehensively in the case of laser cost (blue lasers are usually more expensive), photoelectric conversion efficiency and imaging accuracy, choose a laser with a suitable wavelength.

Preferably, when the beam splitting device is a square prism, one side of the filter can be in direct physical contact with the square prism, and the other side is in physical contact with the photosensitive unit, while the photosensitive unit and the square prism are clamped in the housing, and it ensures a high degree of invariance in the relative position of the individual components.

In some embodiments, especially in the case where the first and second sub-image sensors are infrared light sensors for receiving projected infrared patterns, an additional visible light sensing unit (not shown in the figure) can also be arranged in the image sensor, and is used for capturing the image information of the measured object, so that the image captured by the image sensor contains both the image information of the measured object and the depth information. The visible light sensing unit can be a grayscale sensor or a color sensor. The grayscale sensor only captures brightness information, and the color sensor can be used to capture the color information of the measured object. In this situation, the visible light sensing unit can be composed of three primary color sensing units, where the three primary colors can be red, green, and blue (RGB) or cyan, red, and yellow (CMY). Compared with depth data, visible light images can better distinguish the edges of the target object (especially when the target object is significantly different from the background environment color and/or brightness), so that the combination of visible light images can capture the target object more comprehensively three-dimensional information.

It should be understood that although the structure of the first image sensor 720 is specifically described based on FIG. 7, the second image sensor 730 can also have the same structure. In addition, it should be understood that 723 and 733 can be regarded as the first set of binoculars, 724 and 734 can be regarded as the second set of binoculars, but 723 and 734 can also be regarded as the first set of binoculars, 724 and 733 can be regarded as the second set of binoculars, just turn on the imaging after the corresponding pattern is incident.

In addition to the beam splitting device shown in FIG. 7, in different embodiments, other implementations of the optical path conversion device can also be included, for changing the optical path to deliver the incident return structured light to the first sub-image sensor and the first sub-image sensor.

In the case of using beam splitting to share the light path as shown in FIG. 7, since the light captured by each photosensitive unit will decrease, the sensitivity or effective distance range of imaging can be ensured by increasing the projected brightness or expanding the incident aperture.

Alternatively, optical path sharing can also be implemented based on optical path switching. In this situation, the first and second image sensors 720 and 730 can each include: lens assembly for receiving the incident return structured light; an optical path conversion device for delivering the incident return structured light to at least the first sub-path and the second sub-path; the first sub-image sensor, for imaging the returned structured light on the first sub-path; the second sub-image sensor, for imaging the returned structured light corresponding to different patterns on the second sub-path. In one embodiment, the optical path conversion device can be a rotating mirror, which can reflect the incident light to the photosensitive unit 723 at the 0th ms, reflect the incident light to the photosensitive unit 724 at the 1st ms, and so on. In other embodiments, the optical path conversion device can also be a device that performs optical path conversion based on other mechanical, chemical, or electrical principles.

In the case of a projection device with full pattern projection (rather than scanning projection), the image sensor can be a rolling shutter image sensor, or a global image sensor (i.e., all pixels are imaged simultaneously). The global sensor can achieve higher frame rate, and the rolling shutter sensor can have an adjustable dynamic range, so the type of sensor to be used can be selected according to the actual application scenario.

As mentioned above, the projection device can include a vibrating mirror reciprocating at a predetermined frequency, such as a MEMS vibrating mirror or a mechanical vibrating mirror, for scanning and projecting the structured light to the shooting area at a predetermined frequency and a range of motion. Since the vibrating mirror can achieve extremely high vibration frequency, for example, 2 k per second, it is impossible to directly use the startup signal of the MEMS vibrating mirror for synchronization (because the delay is unreliable), so when synchronization is required (for example, to obtain the rotation angle), considering the characteristics of the phase vibration of the micromirror device, a measuring device for real-time measurement of the vibration phase of the vibrating mirror can be included in the synchronization device.

In one embodiment, the above measurements can be based on the outgoing light itself. Therefore, the above-mentioned measuring device can be one or more photosensors (for example, two photodiodes PD), and the two photosensors are arranged in any of the following ways: arranged on different emission paths of the projection device; arranged on different reflection paths within the projection device; and on outgoing and reflection paths respectively arranged inside and outside the projection device. The layout of the photoelectric sensor can be reasonably selected so that it does not affect the normal projection of the structured light while accurately measuring the phase. The PD can be installed in the projection device, and the instantaneous vibration phase can be determined by measuring the reflection angle when the laser exits the light window. Since the vibration phase of the MEMS vibrating mirror is sinusoidally distributed, one PD can determine the sinusoidal distribution information, and more PDs help to measure the phase more accurately. In other embodiments, the PD can also be installed outside the projection device, for example, installed on the light window, for example, close to the edge of the light window to prevent the influence on the projection in the shooting area. In other embodiments, other methods can also be used for phase measurement, such as capacitance measurement.

However, in other embodiments, the projection device can include a mechanical rotating mirror that rotates in one direction. Correspondingly, when synchronization is required, the measuring device included in the synchronizing device can be an angle measuring device for real-time measuring the motor rotation angle of the reflecting device.

In the above embodiments, the synchronization between projection and exposure is achieved by controlling the exposure of the image sensor. This can be used when the light source projection angle is controllable (for example, the angle and rotation speed of the mechanical vibrating mirror can be controlled by voltage and current), and it is especially useful in cases where the phase and speed of the light source scan are not controllable (for example, for MEMS vibrating mirror or mechanical rotating mirror). Therefore, the MEMS vibrating mirror can use PD or capacitance to detect the angle, and the mechanical rotating mirror can also realize the position detection through voltage detection or photoelectric encoding.

According to another embodiment of the present disclosure, it can also be implemented as a depth data computing device, including: the above-mentioned depth data measuring head; and a processor connected to the depth data measuring head, configured to determine the depth data of the shooting object in the shooting area according to the predetermined relative positions of the first and second image sensors and the set of image frame pairs obtained by imaging the structured light under the binocular solution.

The present disclosure can also be implemented as a method for measuring depth data. FIG. 10 shows a schematic flowchart of a method for measuring depth data according to an embodiment of the present disclosure. The method can be implemented in combination with the structured light projection apparatus, the measuring head, and the computing device of the present disclosure.

In step S1010, projecting a beam having a spot pattern emitted from the light source device at different angles.

In step S1020, imaging a measured space at least twice using first and second image sensors with fixed relative positions to acquire at least two sets of images, wherein, in the at least two imaging, the measured space is projected with different spot patterns due to the different projection angles. In step S1030, obtaining depth data from at least two sets of images and perform depth data fusion.

In the case of using a coaxial binocular structure, imaging a measured space at least twice using first and second image sensors with fixed relative positions to acquire at least two sets of images includes: performing a first imaging using a first sub-image sensor pair having a predetermined relative positional relationship to acquire a first image frame pair; performing a second imaging using a second sub-image sensor pair to acquire a second image frame pair, wherein one sub-image sensor from each of the first and second sub-image sensor pairs shares at least part of an optical path and constitutes the first image sensor, the other sub-image sensor from each of the first and second sub-image sensor pairs shares at least part of an optical path and constitute the second image sensor, and the first and second image frame pairs are used for a single depth data calculation of the shooting area.

The depth data measuring head, calculating device, and measuring method according to the present disclosure have been described in detail above with reference to the accompanying drawings. The depth measurement solution of the present disclosure especially uses an improved structured light projection apparatus capable of reflecting the structured light generated by the light source device at different angles, so as to realize more rapid, economical and low failure rate multi-pattern projection. Furthermore, the structured light projection apparatus can cooperate with multiple pairs of binocular sensors sharing an optical path, thereby further shortening the frame interval, and improving the quality of depth data fusion.

The speckle measurement solution of the present disclosure is especially suitable for the depth measurement of a continuous plane, for example, it can be used for material loading and unloading or welding seam detection in shipyards.

The flowchart and block diagrams in the figures illustrate the architecture, functionality, and operation of possible implementations of systems and methods according to various embodiments of the present disclosure. In this regard, each block in a flowchart or block diagram may represent a module, program segment, or part of code that includes one or more Executable instructions. It should also be noted that, in some alternative implementations, the functions noted in the block may occur out of the order noted in the figures. For example, two blocks in succession may, in fact, be executed substantially concurrently, or they may sometimes be executed in the reverse order, depending upon the functionality involved. It should also be noted that each block of the block diagrams and/or flowchart illustrations, and combinations of blocks in the block diagrams and/or flowchart illustrations, can be implemented by a dedicated hardware-based system that performs the specified functions or operations, or can be implemented by a combination of dedicated hardware and computer instructions.

Having described various embodiments of the present disclosure, the foregoing description is exemplary, not exhaustive, and is not limited to the disclosed embodiments. Many modifications and alterations will be apparent to those of ordinary skill in the art without departing from the scope and spirit of the described embodiments. The terminology used herein is chosen to best explain the principle of each embodiment, practical application, or improvement of technology in the market, or to enable other ordinary skilled in the art to understand each embodiment disclosed herein.

What is claimed is:

1. A depth data computing device, comprising:
    a structured light projection apparatus, for projecting, under the drive of a driving device and at different projection angles, an infrared beam having a texture to a measured space so as to form different textures on an object to be measured in the measured space; and
    first and second infrared image sensors respectively arranged on both sides of the structured light projection apparatus, the first and second infrared image sensors having a predetermined relative spatial position relationship and performing at least two imaging operations on the measured space so as to obtain at least two sets of images having different texture distributions, wherein the at least two sets of images are used for obtaining single-measurement depth data of the object to be measured; and
    a processor, configured to acquire the at least two sets of images, determine the depth data of the texture in each set of images according to the predetermined relative spatial position relationship between the first and second image sensors, and fuse the depth data determined based on the at least two sets of images to obtain new depth data as single-measurement depth data of the object to be measured,
    wherein each of the first and second infrared image sensors comprises at least a first sub-image sensor and a second sub-image sensor that share at least part of an optical path, wherein the first sub-image sensor from the first infrared image sensor and the first sub-image sensor from the second infrared image sensor together form a first set of binoculars, and the second sub-image sensor from the first infrared image sensor and the second sub-image sensor from the second infrared image sensor together form a second set of binoculars,
    wherein the computing device comprising:
    a controller, configured to make the first set of binoculars to perform one imaging operation of the at least two imaging operations, and the second set of binoculars to perform another imaging operation of the at least two imaging operations, sequentially at a first interval, and the first interval being smaller than a minimum frame imaging interval of the sub-image sensors.

2. The computing device according to claim 1, wherein the structured light projection apparatus comprises:
    a light source device, for generating and emitting the infrared beam;
    the driving device, for driving the light source device to project the infrared beam to the measured space at different projection angles.

3. The computing device according to claim 1, wherein the structured light projection apparatus comprises:
    a light source device, for generating and emitting the infrared beam;
    a steering projector, comprising:
    a reflecting device arranged on the outgoing path of the infrared beam, for reflecting the incident infrared beam so that the infrared beam can be emitted;
    the driving device connected to the reflecting device, for changing the angle of the reflecting device relative to the incident infrared beam, so as to change the outgoing direction of the infrared beam.

4. The computing device according to claim 3, wherein the steering projector is a mechanical vibrating mirror, and the reflecting device reciprocates axially; or
    the steering projector is a mechanical rotating mirror, and the reflecting device moves in one direction along the axial direction.

5. The computing device according to claim 1, wherein the drive device remains stationary for a predetermined window period during a continuous movement.

6. The computing device according to claim 1, wherein the light source device comprises:
    a laser generator, for emitting the infrared beam;
    a diffractive optical element arranged on the outgoing optical path of the infrared beam, for diffracting the incident infrared beam and modulate it into discrete spots with specific projection rules; or
    a flood light, for generating flood light; and
    a mask arranged on the flood light, for converting the flood light into lights spots with a specific projection coding.

7. The computing device according to claim 1, further comprising:
    a controller, configured to control the light source device to light up synchronously when the first and second infrared image sensors are exposed.

8. The computing device according to claim 1, wherein the controller is configured to:

make each sub-image sensor perform its next frame imaging at a second interval, which is not smaller than the minimum frame imaging interval of the sub-image sensor.

9. The computing device according to claim 1, wherein each of the first and second infrared image sensors comprises:

lens assembly for receiving incident return structured light;

an optical path conversion device, for changing the optical path to deliver the incident return structured light to the first sub-image sensor and the second sub-image sensor;

the first sub-image sensor and the second sub-image sensor, for imaging different patterns at different times.

10. The computing device according to claim 9, wherein the optical path conversion device comprises:

a beam splitting device, for splitting the incident return structured light into at least a first beam and a second beam, wherein the first sub-image sensor is used for imaging the first beam;

the second sub-image sensor is used for imaging the second beams corresponding to different patterns of the return structured light.

11. The computing device according to claim 9, wherein the optical path conversion device comprises:

an optical path conversion device for delivering the incident return structured light to at least a first sub-path and a second sub-path, wherein, the first sub-image sensor is used for imaging the return structured light on the first sub-path;

the second sub-image sensor is used for imaging the returned structured light corresponding to different patterns on the second sub-path.

12. The computing device according to claim 9, wherein the first sub-image sensor and the second sub-image sensor are the same distance from a beam splitting area of the beam splitting device or an optical path conversion area of the optical path conversion device.

13. The computing device according to claim 9, wherein the first and second image infrared sensors each also comprises:

a visible light image sensor, for imaging incident structured light, wherein the visible light image sensor shares at least part of the optical path with the first and/or the second sub-image sensor.

14. The computing device according to claim 1, wherein, based on the number of different image sets required for a single measurement of depth data, the combination of the projection angle of the corresponding driving device, projection time of the infrared beam, and imaging time of the first and second infrared image sensors are set.

15. A method for measuring depth data, comprising:

projecting an infrared beam having a spot pattern emitted from the light source device at different angles;

performing at least two imaging operations on a measured space using first and second infrared image sensors with fixed relative positions to acquire at least two sets of images, wherein, in the at least two imaging, the measured space is projected with different spot patterns due to the different projection angles;

obtaining depth data from the at least two sets of images and perform depth data fusion, wherein performing at least two imaging operations on the measured space using the first and second infrared image sensors with fixed relative positions comprises:

performing a first imaging operation using a first sub-image sensor pair having a predetermined relative positional relationship to acquire a first image frame pair;

performing a second imaging operation using a second sub-image sensor pair to acquire a second image frame pair, wherein one sub-image sensor from the first sub-image sensor pair and one sub-image sensor from the second sub-image sensor pair share at least part of an optical path and constitutes the first infrared image sensor, the other sub-image sensor from the first sub-image sensor pair and the other sub-image sensor from the second sub-image sensor pair share at least part of an optical path and constitute the second infrared image sensor, and the first and second image frame pairs are used for a single depth data calculation of the shooting area, wherein the first sub-image sensor pair performs one imaging operation of the at least two imaging operations, and the second sub-image sensor pair performs another imaging operation of the at least two imaging operations, sequentially at a first interval, the first interval being smaller than a minimum frame imaging interval of the sub-image sensors.

* * * * *